United States Patent [19]

Brick

[11] Patent Number: 4,824,713
[45] Date of Patent: Apr. 25, 1989

[54] LIGHTNING PROTECTED STRUCTURAL SURFACE

[75] Inventor: Rowan O. Brick, Bellevue, Wash.

[73] Assignee: The Boeing Company, Seattle, Wash.

[21] Appl. No.: 169,146

[22] Filed: Mar. 10, 1988

Related U.S. Application Data

[63] Continuation of Ser. No. 810,355, Dec. 18, 1985, abandoned.

[51] Int. Cl.⁴ .................. B32B 5/16; B32B 15/08; H02H 3/22; B64C 1/00
[52] U.S. Cl. .................. 428/144; 428/99; 428/167; 428/179; 428/213; 428/414; 428/432; 428/433; 244/1 A; 244/133; 361/218; 361/117; 361/212; 174/2
[58] Field of Search .............. 428/323, 144, 167, 179, 428/213, 922; 427/393.1; 361/218, 117, 212; 174/2; 244/1 A, 33

[56] References Cited

U.S. PATENT DOCUMENTS

| Re. 25,417 | 7/1963 | Amason . | |
|---|---|---|---|
| 3,713,880 | 1/1973 | Krekeler | 427/162 |
| 3,755,713 | 8/1973 | Paszkowski . | |
| 3,894,608 | 7/1975 | Haenle . | |
| 3,898,526 | 8/1975 | Hendricks . | |
| 3,906,308 | 9/1975 | Amason et al. . | |
| 3,989,984 | 11/1976 | Amason et al. . | |
| 4,101,689 | 7/1978 | Wienand et al. . | |
| 4,186,237 | 1/1980 | Propp . | |
| 4,237,514 | 12/1980 | Cline . | |
| 4,308,568 | 12/1981 | Whewell | 428/144 |
| 4,323,946 | 4/1982 | Traux . | |
| 4,329,731 | 5/1982 | Meulenberg, Jr. . | |
| 4,398,234 | 8/1983 | Brick et al. . | |
| 4,429,341 | 1/1984 | King . | |
| 4,542,054 | 9/1985 | Fillmann | 428/922 |

OTHER PUBLICATIONS

SAE Technical Paper, "Protection Against the Direct Effects of Lightning Strikes for a Carbon Fiber Composite Aircraft"—by McClenahan et al. (Apr. 1983).

Primary Examiner—P. C. Ives
Attorney, Agent, or Firm—Finnegan, Henderson, Farabow, Garrett, & Dunner

[57] ABSTRACT

Lightning protection apparatus for an exterior structural surface includes an electrically insulating protective coating adhered to the exterior surface, and a plurality of conductive particles supported in the coating. The particles are spaced at distances greater than the dimension of the particles in a direction parallel to the surface. The dielectric strength of the coating is thereby weakened by bridging the thickness of the coating with the particles. This enables lightning attachment to occur at a multiplicity of points rather than at one point, thereby reducing interior sparking in an aircraft and minimizing structual damage to the surface of the aircraft.

9 Claims, 2 Drawing Sheets

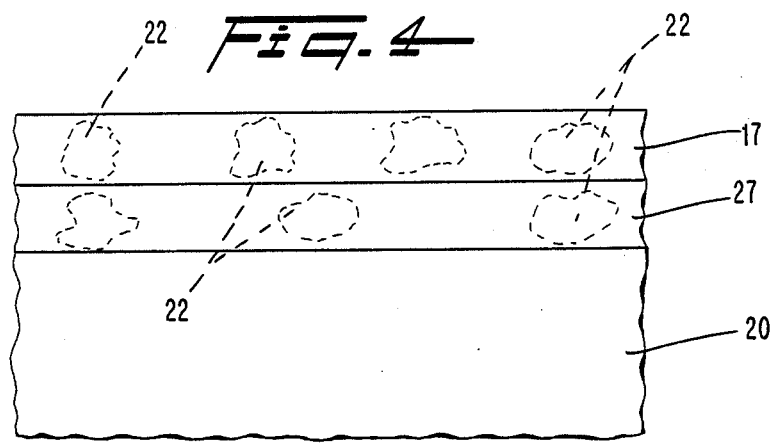
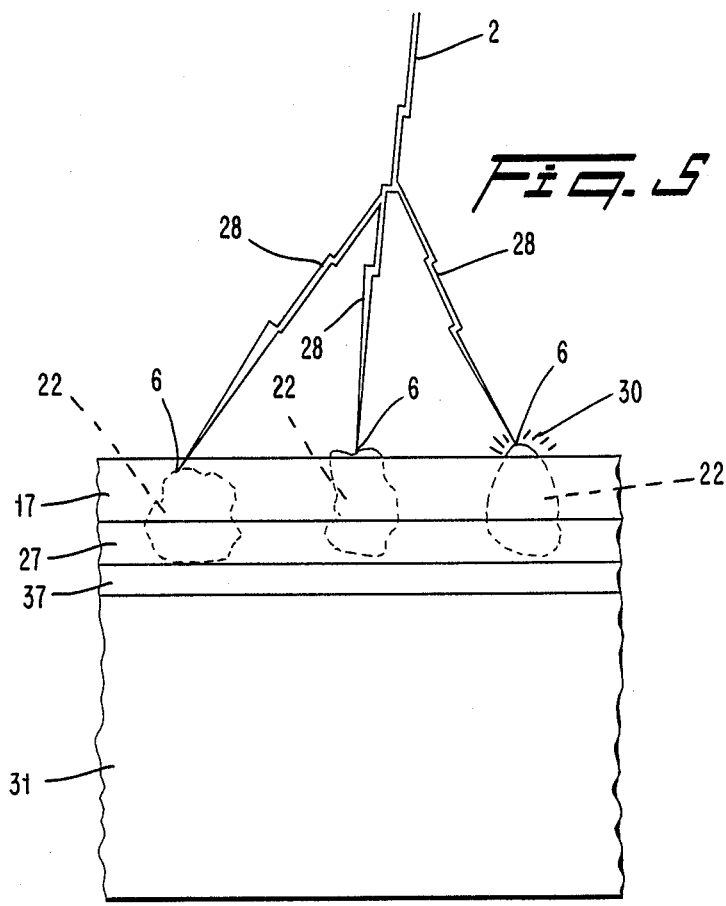
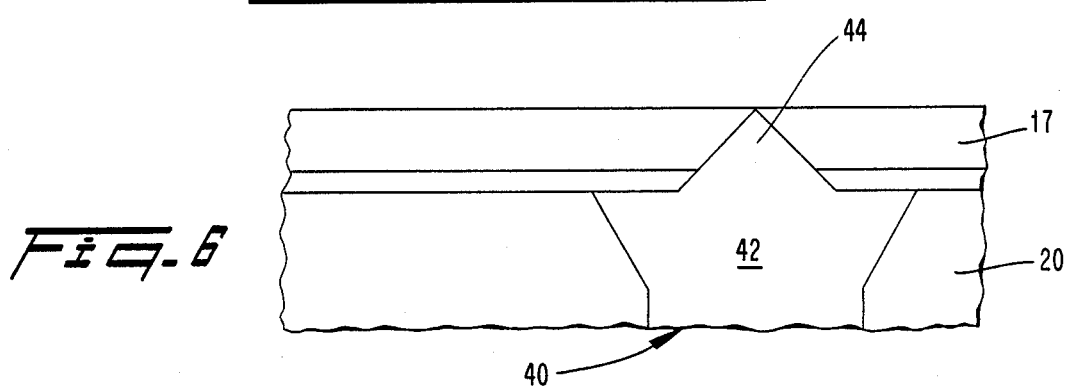

LIGHTNING PROTECTED STRUCTURAL SURFACE

This application is a continuation, of application Ser. No. 810,355, filed 12/18/85, now abandoned.

BACKGROUND OF THE INVENTION

The present invention relates to lightning protection apparatus for an exterior structural surface, either an electrically conductive or a non-conductive surface, and finds particular utility in providing lightning protection for aerospace vehicles. In the field of aerospace vehicles, there exists a need for a lightning protection apparatus which will reduce interior sparking and minimize structural damage to the airfoil surface. There is also a need for an apparatus which will reduce the time that a lightning stroke is attached to the surface of a vehicle.

Exterior surfaces of vehicles such as an aircraft are frequently coated with paints that have excellent dielectric strength properties; that is, the paint coatings have the ability to resist puncture by a lightning stroke. However, when a puncture does occur at a weak point in the paint coating the lightning stroke makes contact with the conductive surface of the aircraft at a point referred to as the attachment point. All of the lightning energy may thus be concentrated at one point. This can produce severe skin surface damage, hot spots, skin puncture, and interior sparking at joints or fasteners.

There currently exist a number of conventional methods for providing lightning protection to painted surfaces. For example, the thickness of the conductive surface can be increased in order to prevent skin puncture, or conductive overlays can be provided over the existing painted surface. These methods are disadvantageous in that they add weigh to the aircraft and are costly. High dielectric strength barriers have been provided in order to prevent attachment to the surface. However, this method, in addition to adding weight and cost, cannot be relied upon for dielectric strength integrity. Another method that has been employed is to load the outer decorative layer of paint with fine conductive particles. However, this coating does not perform well mechanically in severe environments when applied over conductive surfaces and cannot be color matched with the normal decorative colors.

It is therefore an object of the present invention to provide a system of lightning protection for a conductive or nonlayer, which will minimize interior sparking and structural damage to the surface.

It is a further object of the present invention to provide a system of lightning protection which will not add excessive weight to the conductive surface.

It is still a further object of the present invention to provide a system of lightning protection for a conductive surfa which will perform well mechanically in severe environments and will have a pleasing appearance.

It is a further object of the present invention to provide a system of lightning protection which will reduce the time that a lightning stroke is attached to the conductive surface.

SUMMARY OF THE INVENTION

To achieve these and other objects, and in accordance with the purposes of the invention as embodied and broadly described herein, lightning protection apparatus for an exterior structural surface is provided comprising a protective coating of electrically insulating material adhered to the exterior structural surface, and means within the coating for providing locally reduced dielectric strength between the conductive surface of the coating at a plurality of points.

The accompanying drawings, which are incorporated in and constitute a part of the specification, illustrate a preferred embodiment of the invention and, together with the general description of the invention given above and the detailed description of the preferred embodiment given below, serve to explain the principles of the invention.

BRIEF DESCRIPTION OF THE DRAWINGS

FIG. 4 is a schematic diagram illustrating a protective coating with conductive particles formed in accordance with a second embodiment of the present invention;

FIG. 5 is a schematic diagram illustrating a lighting protective coating for a non-metallic surface; and FIG. 6 illustrates a protective coating covering a fastener having a conductive projection.

DESCRIPTION OF THE PREFERRED EMBODIMENTS

Figure 1:
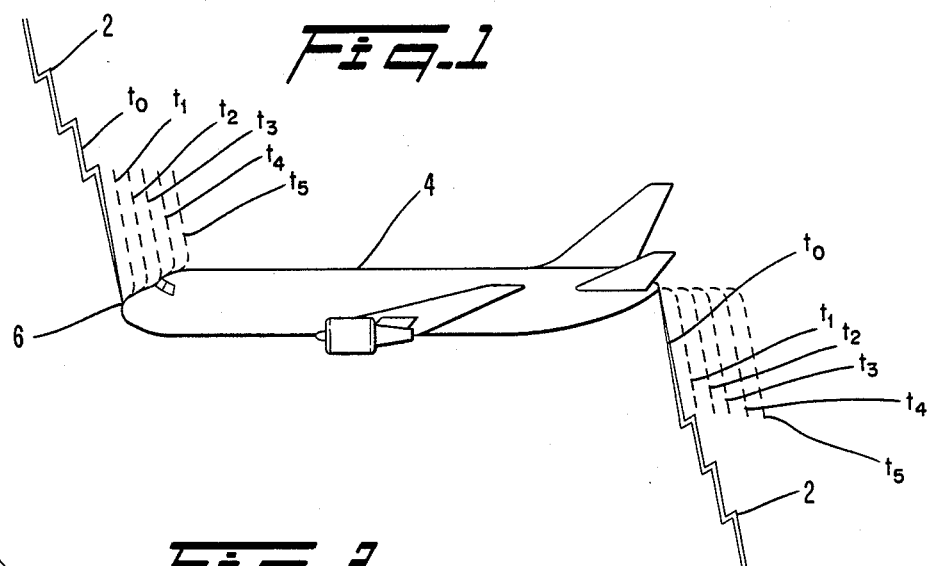
FIG. 1 illustrates an aircraft with a lightning stroke attaching and sweeping.

Reference will now be made in detail to the present preferred embodiments of the invention, examples of which are illustrated in the accompanying drawings in which like reference characters refer to like elements.

A lightning stroke begins with a step leader channel which develops from the cloud toward the ground or towards another charge center. As a step leader channel approaches an aircraft, high electrical fields are produced at the surface of the aircraft. These electrical fields create streamers which propagate away from the aircraft toward the step leader until one of them contacts the approaching lightning step leader. This will continue until one of the branches of the step leader reaches the ground or another charge center. The high current associated with lightning occurs after the step leader reaches the ground or charge center and forms a return stroke. This return stroke develops as the charge in the step leader channel flows into the low impedance ground to neutralize the charge which was attracted into that portion of the ground prior to establishment of the stroke channel.

The present invention is related to lightning protection apparatus for aircraft and other aerospace vehicles which reduces interior sparking and minimizes structural damage to an airfoil surface by encouraging multipoint attachments of a lightning channel to the conductive surface. Multipoint attachments can significantly reduce the energy dissipated at any one point when compared to a single attachment point. This energy reduction is approximately $E/n^2$ where E equals the total energy in the lightning channel for a single attachment point and n is the number of attachments for a multipoint attachment. The encouragement of multipoint attachments also reduces the dwell time in a lightning strike swept stroke zone. This is accomplished by allowing reattachment to occur more easily due to the locally weakened dielectric strength of the paint.

FIG. 1 shows the manner in which a lightning stroke typically interacts with an airplane. Initially the stroke will have at least one entrance point and one exit point. Usually the initial attachment point is at an extremity of the airplane such as the nose, wings, or propeller blade. A lightning stroke has a channel 2 which is substantially stationary in space during the time it is transferring electrical charge. When the stroke attaches to airplane 4 at an attachment point 6 at time $t_o$, airplane 4 becomes part of lightning channel 2. Due to the speed of airplane 4 and the length of time that lightning channel 2 exists, airplane 4 moves relative to lightning channel 2 and the forward lightning channel 2 appears to sweep back over a portion of the surface known as the "swept stroke zone" over time periods $t_1$ through $t_5$. The significance of the swept stroke zone is that portions of the vehicle that would not be targets for the initial entry and exit point of a lightning flash may also be damaged as the stroke is swept aft over the vehicle. The amount of damage produced at a given attachment point by a swept stroke depends upon the type of material, the dwell time at that attachment point, and the lightning currents which flow during the attachment.

Figure 2:
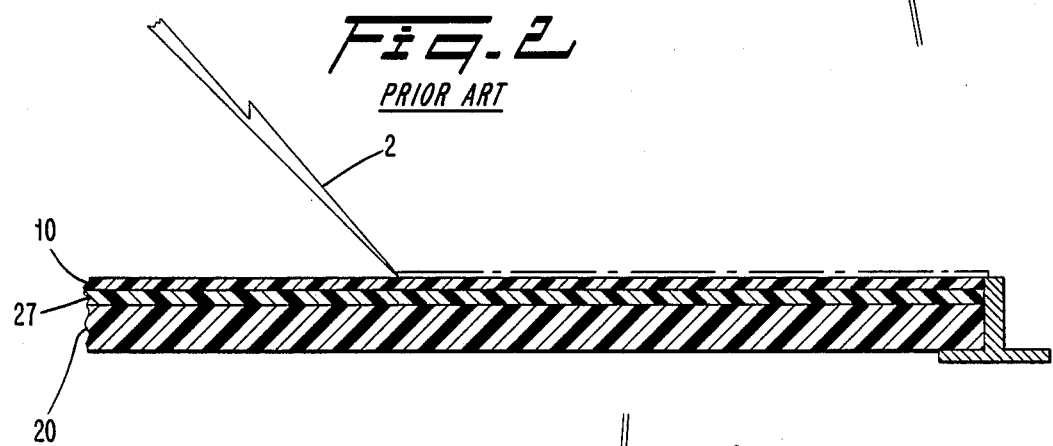
FIG. 2 illustrates a prior art conductive coating with conductive particles in contact with each other.

As described above, various methods have been attempted in order to provide lightning protection to conductive surfaces. One such method is illustrated in FIG. 2 where an outer decorative layer of paint 10 is loaded with fine conductive particles and is placed over a primer coating 27 and conductive surface 20. This method is disadvantageous in that it does not exhibit good mechanical performance in severe environments when applied over conductive urfaces. That is, coatings heavily laden with fine conductive particles will degrade the adhesion and erosion properties of the coating and will not provide the protective qualities needed over acceptable periods of time. Moreover, it is difficult to color match such coatings with normal decorative coatings.

Figure 3:
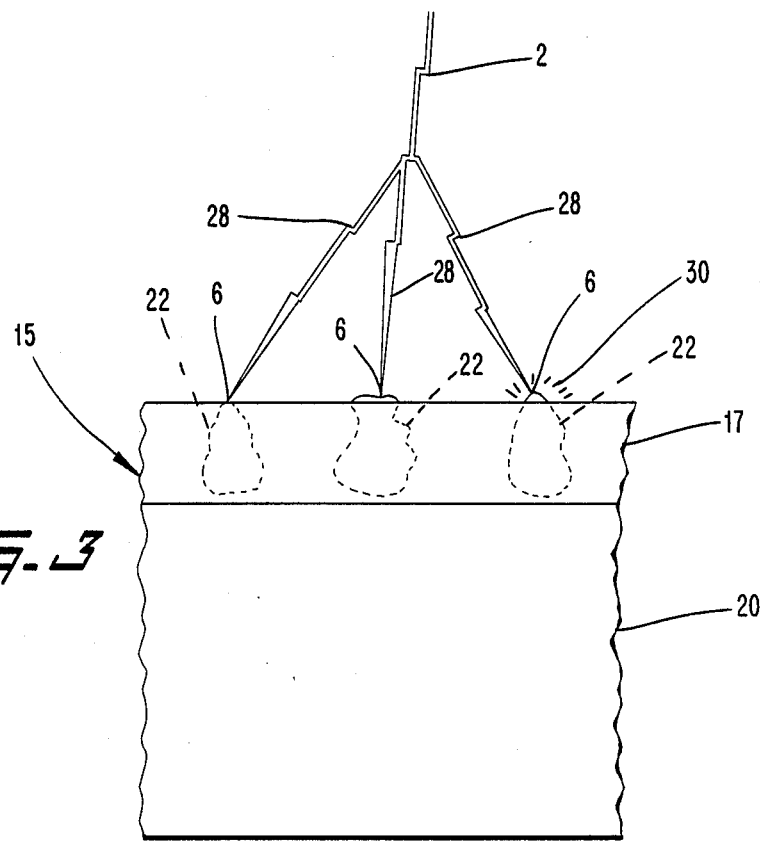
FIG. 3 is a schematic diagram illustrating a protective coating with conductive particles formed in accordance with a preferred embodiment of the present invention.

A lightning protection system which constitutes a preferred embodiment is shown in FIG. 3 and is represented generally by the numeral 15. System 15 includes an electrically insulating protective coating 17 adhered to a conductive surface 20. The invention includes means within the coating for providing locally reduced dielectric strength between the exterior structural surface and the exterior surface of the coating at a plurality of points. As embodied herein, the means for providing reduced dielectric strength includes conductive particles 22 which bridge the thickness of electrically insulating protective coating 17. This allows a lightning stroke to attach at a multiplicity of points 6 rather than one point and provides a coating having excellent appearance, color matching ability, and protective qualities.

As channel 2 approaches conductive surface 20, intense electrical fields 30 are produced which tend to produce multiple streamers 28 propagating from particles 22 toward the approaching lightning channel 2. The size and shape of particles 22 can enhance the ease with which multiple streamers 28 are produced by intensifying local fields 30 around the particle. A sharp pointed, irregularly shaped particle 22 may thus be more desirable for some applications than a flat or spherical particle. Moreover, it may be desirable to employ irregularly shaped particles 22 with major and minor dimensions and to align particles 22 such that their major dimensions are substantially perpendicular to surface 20, as shown in FIG. 3. This can be accomplished by electrostatic painting processes well-known in the art. In any case, particles 22 are spaced within electrically insulating protective coating 17 at distances greater than the dimension of the particles in the direction parallel to surface 20. For maximum effectiveness, particles 22 should also have a maximum dimension greater than one-tenth the thickness of coating 17.

Particles 22 need not be in electrical contact with adjacent particles. Although controlled spacing may be required in some cases, random spacing may be acceptable in other cases depending upon the conductivity and location of the surface to be protected. Initially, particles 22 need not be connected electrically to conductive surface 20, but must connect electrically to conductive surface 20 when under high electrical field stress such as an approaching lightning stroke. Such electrical connection to surface 20 will occur at a much lower electric field strength than that required to puncture coating 17 and, thus, will enhance multiple attachments.

Particles 22 may also be formed in layers as shown in FIG. 4. One layer of particles 22 is embedded in electrically insulating protective coating 17 and another layer of particles 22 is embedded in a primer layer 27. However, in this arrangement, a greater number of particles 22 is required so that the probability of particle alignment to bridge both layers is sufficient to insure that the dielectric strength in the vicinity of particles 22 from the outer surface of coating 17 to conductive surface 20 is less than the dielectric strength between adjacent particles 22 in a direction parallel to surface 20.

The reduction of the dielectric strength of coating 17 will also reduce the dwell time of attachment points in swept stroke zones where lightning channel 2 lays close to conductive surface 20. Since lightning channel 2 can easily reattach to another location downstream, the energy input to any one localized area is reduced.

As shown in FIG. 5, the invention may be utilized for lightning protection of non-metallic surfaces such as a surface 30 composed of a conductive graphite-epoxy compound or a non-conductive fiberglass compound. An external conductive coating 37 of, for example, conductive metallic film, a conductive primer, or wires, may be interposed between primer 27 and the surface 30. This improves the ease of formation of streamers 28, thereby further encouraging multipoint attachment to conductive particles 22.

FIG. 6 illustrates a lightning protection system 40 which includes a plurality of conductive fasteners 42 capable of carrying high currents. System 40 includes an electrically insulating protective coating 17 adhered to conductive surface 20 which also covers fasteners 42. A conductive projection 44 is formed on each fastener 42 which extends in a direction perpendicular to conductive surface 20, thereby reducing the dielectric strength of coating 17 in the area of each fastener 42. Projection 44 of fastener 42 thus forms a more desirable attachment point for a lightning stroke as compared to other adjacent areas. Fastener 42 may be a threaded fastener or a standard structural fastener. A plurality of fasteners 42 is provided in order to minimize the current flow in any one fastener 42 by enhancing multipoint attachment.

It will be apparent to those skilled in the art that various modifications and variations can be made to the lightning protection apparatus of the present invention without departing from the scope or spirit of the invention. Thus, it is intended that the present invention cover the modifications and variations of the invention, provided they come within the scope of the appended claims and their equivalents.

What I claim is:

1. A lightning protected structural surface, comprising:
   a structural substrate;
   a protective coating of electrically insulating material adhered to said substrate; and
   a plurality of conductive particles supported in said coating, said particles being spaced in a direction parallel to said surface a distance greater than the thickness of said coating and wherein the dielectric strength between adjacent ones of said plurality of conductive pareticles in said directinn parallel to said structural surface is greater than the dielectric strength from the outer surface of said coating to said structural surface.

2. A structural surface as recited in claim 1 wherein said particles have a maximum dimension greater than one-tenth the thickness of said coating.

3. A structural surface as recited in claim 1 wherein said particles are irregularly shaped.

4. A structural surface as recited in claim 1, wherein said particles are in electrical contact with said substrate when under high electrical field stress.

5. A structural surface as recited in claim 1 wherein the separation between adjacent ones of said plurality of conductive particles in a direction parallel to said exterior structural surface is greater than the dimension of said particles in a direction parallel to said exterior structural surface.

6. A structural surface as recited in claim 1 further comprising a primer layer adhered to said substrate and supporting said electically insulating protective coating.

7. A structural surface aas recited in claim 6 wherein said substrate is electrically non-conductive and wherein said structural surface further comprises a plurality of conductive particles supported in said primer layer, said particles being spaced at distances greater than the maximum dimension of said particles.

8. A structural surface as recited in claim 6 further comprising an external conductive layer interposed between said substrate and said primer.

9. A structural surface as recited in claim 8, wherein each of said plurality of conductive particles has a major and a minor dimension, said major dimension being greater in length than said minor dimension, with said major dimension being aligned perpendicularly to said exterior structural surface.

* * * * *